(12) United States Patent
Monette et al.

(10) Patent No.: US 10,304,270 B2
(45) Date of Patent: May 28, 2019

(54) SECURED COMMUNICATION SYSTEM AND DATA MODEL TO FACILITATE AUTHORIZATION TO ACCESS RENTAL PROPERTY

(71) Applicant: HomeAway.com, Inc., Austin, TX (US)

(72) Inventors: Jonathan S. Monette, Austin, TX (US); Aaron Miller, Lakeway, TX (US); Jeffrey A. Bloom, Austin, TX (US)

(73) Assignee: HomeAway.com, Inc., Austin, TX (US)

( * ) Notice: Subject to any disclaimer, the term of this patent is extended or adjusted under 35 U.S.C. 154(b) by 0 days.

(21) Appl. No.: 14/935,222

(22) Filed: Nov. 6, 2015

(65) Prior Publication Data
US 2017/0132862 A1 May 11, 2017

(51) Int. Cl.
| | |
|---|---|
| G05B 19/00 | (2006.01) |
| G05B 23/00 | (2006.01) |
| G06F 7/00 | (2006.01) |
| G06F 7/04 | (2006.01) |
| G06K 19/00 | (2006.01) |
| G08B 29/00 | (2006.01) |
| G08C 19/00 | (2006.01) |
| H04B 1/00 | (2006.01) |
| H04B 1/38 | (2015.01) |

(Continued)

(52) U.S. Cl.
CPC ..... *G07C 9/00309* (2013.01); *G07C 9/00571* (2013.01); *G07C 9/00896* (2013.01); *H04L 63/0421* (2013.01); *H04L 63/102* (2013.01); *G07C 9/00817* (2013.01); *G07C 9/00857* (2013.01)

(58) Field of Classification Search
CPC ............ G07C 9/00309; G07C 9/00896; H04L 63/0421
USPC .......................................................... 340/561
See application file for complete search history.

(56) References Cited

U.S. PATENT DOCUMENTS

| | | | |
|---|---|---|---|
| 2002/0099575 A1 | 7/2002 | Hubbard | |
| 2007/0027708 A1* | 2/2007 | Brown ................... | G06Q 10/02 705/80 |

(Continued)

*Primary Examiner* — Tanmay K Shah
(74) *Attorney, Agent, or Firm* — Knobbe, Martens, Olson & Bear, LLP

(57) ABSTRACT

Various embodiments relate generally to electrical and electronic hardware, computer software and systems, wired and wireless network communications, and wearable computing devices for establishing a secure, closed-loop communication channel for authorizing access to rental properties. More specifically, a system, a device and a method are configured to facilitate authorization via secure communications between an inquiring entity and a responding entity to access a rental property. In one or more embodiments, a method can include establishing a data arrangement representing a messaging dialog between an inquirer and a responder. The messaging dialog may include data representing exchange of electronic messages. Further, the method may include suppressing transmission of the identity data of the inquirer and the responder during the exchange of the electronic messages to form secured messages, and generating anonymized transaction data representing authorization to access the rental property.

20 Claims, 9 Drawing Sheets

(51) Int. Cl.
  *H04B 3/00* (2006.01)
  *H04Q 1/00* (2006.01)
  *H04Q 9/00* (2006.01)
  *G07C 9/00* (2006.01)
  *H04L 29/06* (2006.01)

(56) References Cited

U.S. PATENT DOCUMENTS

| | | |
|---|---|---|
| 2008/0228747 A1 | 9/2008 | Thrall |
| 2009/0037301 A1 | 2/2009 | Powell |
| 2009/0083093 A1* | 3/2009 | Colletti .................. G06Q 10/06 705/307 |
| 2009/0099944 A1 | 4/2009 | Robinson |
| 2009/0106254 A1 | 4/2009 | McCoy |
| 2009/0210524 A1 | 8/2009 | McCormack |
| 2009/0237245 A1 | 9/2009 | Brinton |

* cited by examiner

SECURED COMMUNICATION SYSTEM AND DATA MODEL TO FACILITATE AUTHORIZATION TO ACCESS RENTAL PROPERTY

FIELD

Various embodiments relate generally to electrical and electronic hardware, computer software and systems, wired and wireless network communications, and wearable computing devices for establishing a secure, closed-loop communication channel for authorizing access to rental properties. More specifically, a system, a device and a method are configured to facilitate authorization via secure communications between an inquiring entity and a responding entity to access a rental property.

BACKGROUND

A vacation rental marketplace in which disparate owners of second or vacation homes make their properties available to vacationers has experienced increasing growth recently. In a vacation rental marketplace, a family or a group of people (e.g., group of friends) may rent anything from cabins, condominiums, summer homes, to villas, barns, farm houses, and castles. These types of rental properties are desirable as typical hotel or motel buildings are not well-suited to accommodate families or groups of people, and are usually less private and less comforting to some guests.

With the advent of networked computing devices, the computer-based renting of properties electronically has enabled travelers to more readily enjoy the experiences of renting others' homes. However, some conventional techniques and known technological approaches to renting properties rely on relatively open forms of communication between a potential traveler and an owner of a rental property, whereby the exchanged communications are vulnerable to access by third parties. Such exposure presents opportunities for identity theft, fraud, and other criminal or mischievous activities. As an example, one type of fraud can arise when a third-party hijacks a rental property owner's email account with which a thief may fraudulently induce a potential traveler to expose, for example, credit card information.

Further, conventional computing devices commonly used to facilitate traditional vacation rental marketplaces are not well-suited to detect whether a potential traveler or a putative owner are authentic prior to exposure to risks or disadvantages due to, for example, a fraudulent traveler and/or owner.

Thus, what is needed is a solution for forming a secured communications channel effectively in association with a computerized rental system without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
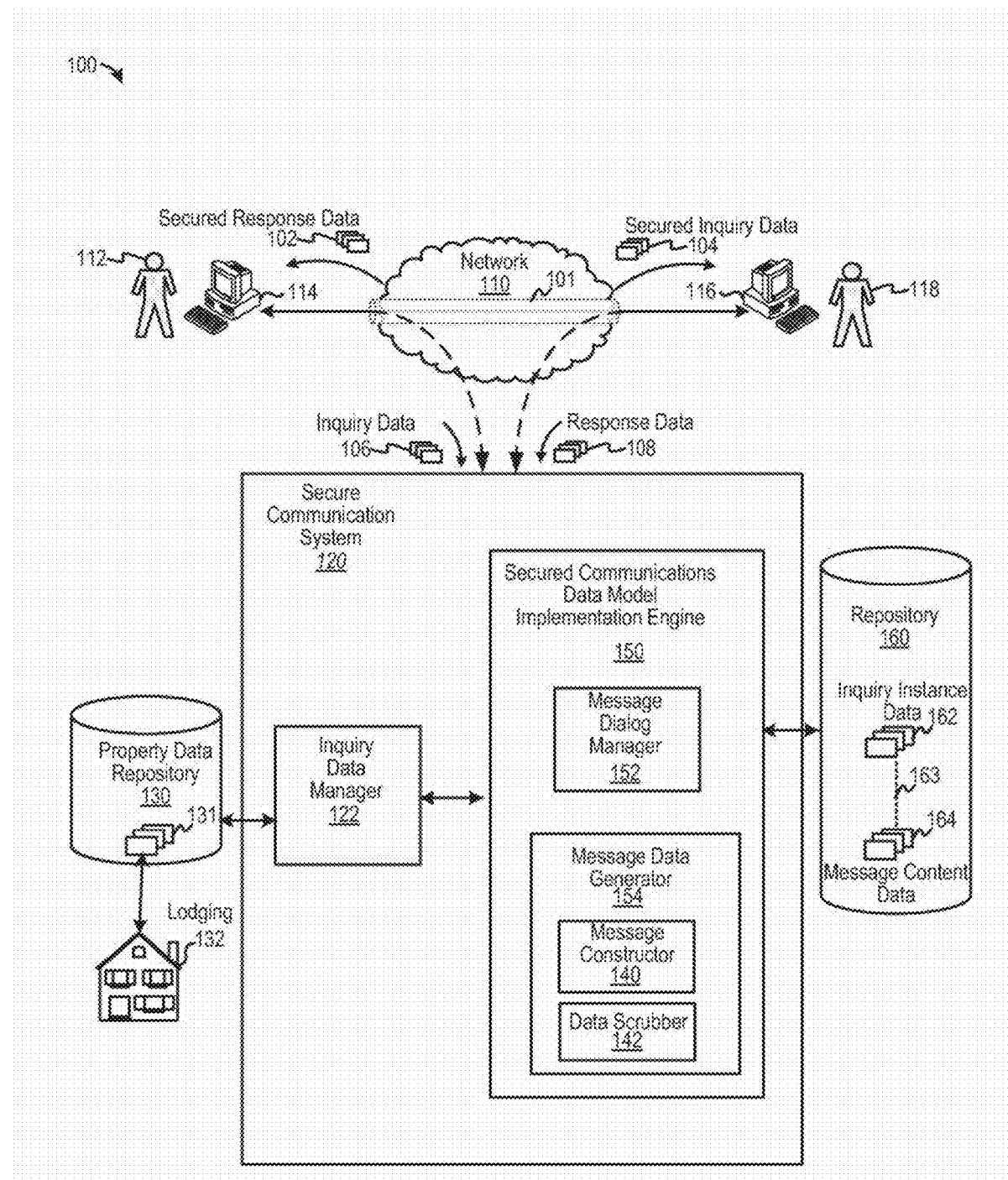
FIG. 1 is a diagram depicting a secure communication system, according to some embodiments.

FIG. 1 is a diagram depicting a secure communication system, according to some embodiments. Diagram 100 includes a secure communication system 120 configured to, among other things, to facilitate authorization to access a rental property through secure communications between an inquirer (e.g., such as a traveler, or a potential traveler) and a responder (e.g., a potential owner or agent). As such, secure communication system 120 provides an infrastructure and/or a networked computerized system configured to establish a secure communications channel 101 via a network 110 (e.g., the Internet) between a computing device 114 and a computing device 116. Secure communications channel 101, as generated by secure communication system 120, may enable an inquirer 112, such as a traveler inquiring about the availability of a rental property, to established relatively closed channels of communication with a responder 118, such as the responding owner of the rental property of interest. In some examples, secure communications channel 101 may be a predominately closed channel, or closed-loop communication, that may have reduced, negligible, or no exposed information or data that otherwise may be accessed by other parties or entities.

According to some embodiments, secure communication system 120 may be configured to form secured messages, such as secured response data 102 and secured inquiry data 104, that may exclude, for example, identity data or other sensitive data associated with either inquirer 112 or responder 118, or both. In some examples, secured messages exchanged between computing devices 114 and 116 may include anonymized transaction data constituting at least a portion of secure communications channel 101. In accordance with at least one implementation, secure communication system 120 operates to receive data representing an inquiry (i.e., inquiry data 106), the inquiry relating to access to a rental property owned by or otherwise managed by responder 118 in exchange for payment or any other form of compensation. According to some embodiments, inquiry data 106 includes data representing an inquiry as to whether a rental property is available, the rental property having certain desirable attributes or characteristics in which the inquirer is interested. For example, computing device 114, responsive to input by inquirer 112, may generate inquiry data 106 including requests and/or confirmation whether a rental property of interest has features, restrictions, or other information relating to a number of bedrooms, a number of beds and/or sleeping accommodations (e.g., a number of sleeping locations, such as "sleeps 8"), a number of bathrooms, as well as whether smoking, pets, wheelchair accessibility, and other like features are available. Further, inquiry data 106 may include additional data seeking or confirming whether a rental property is in a city, a rural region, a beach-region, an area near water, including rivers or smaller bodies of water, an area in or around mountains (e.g., suitable for hiking, horseback riding, skiing, sledding, and the like), a rental property in a forest, and other like geographic and/or terrain-based features. Inquiry data 106 may include any other related types of data, such as whether a certain activity (e.g., golfing, dining, swimming, etc.), is available adjacent to the rental property.

Inquiry data 106 is received into secure communication system 120 for further processing, including extracting inquiry-related information including various attributes relating to a rental property of interest such as those described above. Secure communication system 120 receives inquiry data 106 and is configured to generate a message directed to computing device 116 subsequent to which a responder 118 resides. According to various embodiments, secure communication system 120 generates, based on inquiry data 106, secured inquiry data 104 for transmission to computing device 116.

Secured inquiry data 104 includes data generated by computing device 114 and omits data that may otherwise identify inquirer 112 or data that may be of sensitive nature (e.g., financial data associated with inquirer 112, such as credit card account numbers, phone numbers, addresses, or any other type of personal data), according to some embodiment. According to some examples, secured inquiry data 104 may include data and/or information as a prerequisite to secure access to a rental property associated with responder 118. The prerequisite data may exclude identity data and other related information that may expose inquirer 112 to identity theft or other fraudulent activity. According to at least one example, secured inquiry data 104 includes at least a portion of anonymized transaction data, whereby the transaction data associated with inquiry data 106 may be anonymized.

Computing device 116, responsive to responder 118, may generate data, such as response data 108, for delivery via secure communications channel 101 to computing device 114. In some examples, response data 108 is received into secure communication system 120 for generating secured response data 102 for delivery to computing device 114 via secure communications channel 101. During or subsequent to generating secured response data 102, secure communication system 120 may suppress or otherwise anonymize data representing an identity of a responder 118. According to at least one example, secured response data 102 includes at least another portion of anonymized transaction data, whereby this other transaction data associated with response data 108 may be anonymized. In some cases, anonymized transaction data excludes identities and other information that might be used, including contact information, to determine an identity of either inquirer 112 or responder 118, or both.

Secure communication system 120 may be configured to establish a data arrangement representing a messaging dialogue between inquirer 112 and responder 118, whereby the messaging dialogue may include data representing an exchange of electronic messages and content that include either inquiry data 106 and response data 108 or secured response data 102 and secured inquiry data 104, or both. According to some examples, the data arrangement representing the messaging dialogue may be a data structure or any other relational schema in which to relate data, including any known databases and the like. In this example, a messaging dialogue is a set of data including content of one or more electronic messages exchanged between computing device 114 and computing device 116.

According to some examples, secure communication system 120 authenticates (e.g., determines with relatively high degree of likelihood) the identity of inquirer 112 is an authentic traveler and the identity of responder 118 is an authentic owner of a rental property. Prior to authentication, secure communication system 120 may be configured to suppress transmission of identity data of inquirer 112 and responder 118 during the exchange of electronic messages, thereby forming secured messages that constitute at least a portion of secure communications channel 101. As such, exchanges of secured response data 102 and secured inquiry data 104 are anonymized, and include anonymized transaction data that may be sufficient to authorize access to a rental property.

In view of the foregoing, the structures and/or functionalities of secure communication system 120 and its components can form a secure communications channel to facilitate secure communication between a traveler and a rental property owner (or agent thereof). In accordance with various embodiments, secure communication system 120 may be configured to reduce or otherwise negate exposure of data including identity information, financial information, or any other sensitive, personal information that otherwise may be accessible to third parties (e.g., hackers, identity thieves, larcenists, or any other ill-intentioned parties). As such, a traveler may be assuaged prior to committing to a rental transaction in that they are dealing with an owner of a rental property of interest, as determined by secure communication system 120, rather than another party. Moreover, an owner also may be comforted to deal with an authenticated traveler, as determined by secure communication system 120, prior to committing to the rental transaction. In some examples, the identities of inquirer 112 and responder 118 may become non-anonymized (e.g., accessible or viewable) to either party upon completion of the transaction. Further, secure communication system 120 may be configured to assess a degree of risk that indicates a level of confidence that the identities of either inquirer 112 or responder 118 are authentic. According to some embodiments, data in inquiry data 106 and/or response data 108 may be analyzed to determine whether the data or patterns of data (e.g., statistically) comport to normative traveler and owner messaging data rather than anomalous traveler or anomalous owner-related messaging data (e.g., anomalies due to fraudulent or unauthorized access to data or electronic messaging accounts). Also, secure communication system 120 may be configured to generate a user interface, including a dashboard graphical display, that is configured to display either secured inquiry data 104 or secured response data 102, or both.

Diagram 100 further depicts secure communication systems 120 including an inquiry data manager 122 and a secure communications data model implementation engine 150. Inquiry data manager 122 may be coupled to a property data repository 130 and secured communications data model implementation engine 150 to facilitate communications among a number of elements of secure communication system 120. Inquiry data manager 122 may include logic, such as hardware, software, or a combination thereof, that may be configured to access property data repository 130, which includes property attribute data 131 associated with or describing a lodging 132 (e.g., a rental property of interest). According to some embodiments, inquiry data manager 122 is configured receive inquiry data 106 that may include data requesting availability or other information regarding a lodging 132 having configurable access for use as temporary lodging. Further, inquiry data manager 122 may be configured to identify an identity of responder 118, a property identifier that uniquely identifies lodging 132, availability information (e.g., calendar information), and other like information that may be of interest to a traveler. In some examples, property attribute data 131 may specify: data representing a number of bedrooms or sleeping positions, data representing a number of bathrooms, data representing a number of flights of stairs (e.g., elderly or physically disabled persons may prefer a one story facility), data representing a theme (e.g., suitable for business travel, a romantic visit, a family vacation, in a historic area, etc.), data representing a type of region, such as whether lodging 132 is disposed in a city, a rural area, on a beach, at or adjacent other water features, in a desert, in mountainous regions, in a forest, etc., data representing whether smoking is permissible, data representing whether pets are permissible, data representing whether wheelchairs have accessibility, and the like.

Secured communications data model implementation engine 150 is depicted as including a message dialog manager 152 and a message data generator 154, whereby secured communications data model implementation engine 150 may include hardware, software, or a combination thereof, and may constitute an engine and a domain model configured to manage secure communications between computing devices 114 and 116.

Message dialog manager 152 is configured to identify electronic messages constituting inquiry data 106 in response data 108, as well as electronic messages constituting secured response data 102 and secured inquiry data 104. Further, message dialog manager 152 may be configured to identify the exchange of messages as a dialogue or conversation between two parties interested in authenticating identities for purposes of transacting a rental of property. According to some embodiments, message dialog manager 152 may be described as a "switchboard" (e.g., a switchboard application) that is configured to receive data representing events, including inquiries, and is configured to distribute data among various components of secure communication system 120 and to persist data to repository 160, which may include a database, a data arrangement, a data structure, or any other data relationships disposed in memory or storage.

As shown in diagram 100, message dialog manager 152 is configured to communicate with a repository 160, which may include inquiry instance data 162 linked via one or more relationships 163 to message content data 164. Inquiry instance data 162, in some examples, includes data representing a relationship (e.g., data representing tags, links, pointers, etc.) among a number of electronic messages exchanged between traveler and owner (e.g., computing devices 114 and 116). Thus, inquiry instance data 162—in the aggregate—represents a dialogue or conversation between inquirer 112 and responder 118. Links 163 may include data that relates electronic messages (e.g., message data including header information) to the content of messages in data 164. According to some embodiments, electronic messages exchanged between inquirer 112 and responder 118 may take the form of email messages, whereby message content data 164 includes text or audio data disposed in an email. According to various embodiments, message dialog manager 152 is configured to maintain links 163 to identify a dialogue over any amount of time, up to, and including a time at which a rental property transaction is completed, as well as for archival and future purposes.

Message data generator 154 is configured to generate electronic messages including secured response data 102 and secured inquiry data 104, among other things. As shown, message data generator 154 may include a message constructor 140 and a data scrubber 142, according to some examples. Message constructor 140 may be configured to construct electronic messages that include secured response data 102 and secured inquiry data 104, whereby message constructor 140 is configured to automatically generate messages, based on user input from either inquirer 112 or responder 118, that include non-sensitive data, such as property attribute data 131, and excludes identity and other sensitive types of data (e.g., such as financial data). Data scrubber 142 is configured to detect identity data, financial data, account data, contact information data, and other sensitive types of data, and is further configured to delete, mask, obfuscate, remove, substitute, or otherwise render such identity data imperceptible or unusable. For example, in an exchange of emails as electronic messages between computing devices 114 and 116, email addresses may be deleted, obfuscated, or otherwise substituted with non-identifying data. Similarly, data scrubber 142 may redact, remove, mask, or otherwise substitute identity or other sensitive data in a body of an electronic message, such as an email address. For example, a telephone number or other contact information in a body of an email may be removed or otherwise rendered imperceptible.

According to some examples, secure communication system 120 may be configured to determine or otherwise provide authorization to inquirer 112 to access the rental property associated (e.g., owned by responder 118). In one example, authorization may be provided in the form of electronic digital codes that can be transmitted (e.g., via email) to an authenticated inquirer 112, whereby inquirer 112 may use the codes to open a door and a gain access to the rental property consistent with an agreed rental agreement based on the exchange of electronic messages and transactional data therein. In some cases, data may be generated that indicates an exchange of data indicative of a unit of value exchanged for access to the rental property. As an example, a unit of value may be a US dollar, and any number of dollars may be exchanged (e.g., using data representing credit card account, checking account, or other transactions).

Note that data representing a messaging dialogue may include a collection of data representing an electronic conversation aggregated as a pre-condition to authorizing the access to the rental property. An example of a precondition may include, but is not limited to, exchanging units of currency for access to a rental property for a finite duration of time. Subsequent to granting authorization, secured response data 102 and secured inquiry data 104 may be converted such that the previously anonymized transaction data (prior to authorization) may be converted into non-anonymized transaction data so that the identity data of inquirer 112 and responder 118 are available to each other. Examples of identity data include one or more of a name, an email address, and a phone number, or the like.

Figure 2:
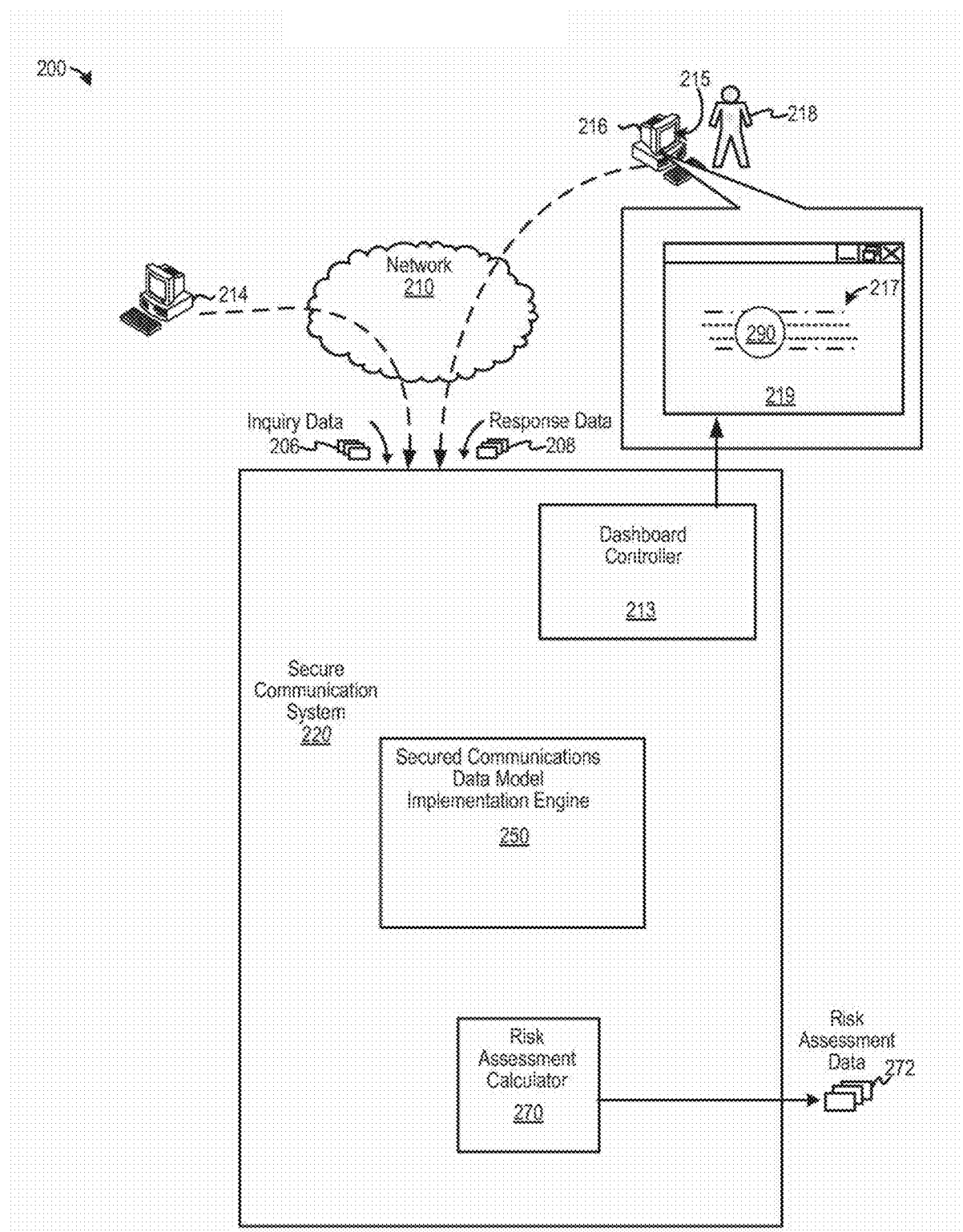
FIG. 2 is a diagram depicting an example of a secure communication system configured to generate a user interface and/or risk assessment data, according to some examples.

FIG. 2 is a diagram depicting an example of a secure communication system configured to generate a user interface and/or risk assessment data, according to some examples. Diagram 200 depicts secure communication system 220 configured to receive inquiry data 206 via network 210 from a computing device 214, as well as response data 208 via network 210 from computing device 216 responsive to input by a responder 218, which may be an owner of real property (for rent) or an agent thereof. Note that elements depicted in diagram 200 of FIG. 2 may include structures and/or functions as similarly-named or similarly-numbered elements of FIG. 1. Further to diagram 200, secure communication system 220 may include a dashboard controller 213 and a risk assessment calculator 270. Dashboard controller 213 is configured to include logic (e.g., hardware, software, or a combination thereof) for receiving data from secured communications data model implementation engine 250 for generating interactive imagery for display as a dashboard and/or user interface 219 on display 215 of, for example, computing device 216. In the example shown, a dashboard 219 generated by dashboard controller 213 may include a depiction of an electronic communication, such as an email, which may include a group 217 of symbols (e.g., text) that constitute control data (e.g., header information) and/or payload data (e.g., message content). According to some examples, a portion 290 of an electronic message represents a portion of group 217 that is removed, obscured, or otherwise rendered imperceptible. Dashboard controller 213 may also be configured to providing interactive inputs/outputs describing data for renting a property including, for example, data representing a number of bedrooms or sleeping positions, data representing a number of bathrooms, data representing whether smoking is permissible, data representing whether pets are permissible, data representing whether wheelchairs have accessibility, among other types of data. According to various examples, a dashboard controller 213 may generate dashboards 219 for a computing device 214 and one or more dashboards for computing device 214, whereby the dashboards for different persons or roles (e.g., travelers distinguished from owners) may be generated.

Risk assessment calculator 270 may be configured to assess risk that either a user associated with a computing device 214 or user associated with the computing device 1016, such as responder 218, may not be authentic (e.g., a person fraudulently using another's identity). Assessment of such risk may be quantified and incorporated into risk assessment data 272. Risk assessment calculator 270 may receive data from secured communications data model implementation engine 250 for generating risk assessment data 272. Risk assessment calculator 270 may analyze message content over a number of messages in a message dialogue. For example, risk assessment calculator 270 may analyze inquiry data 206 to determine whether one or more portions of the message content are typical (e.g., requests for accommodation similar to past rentals by a specific traveler, or to other past travelers in association with the rental property of interest) or are within expected tolerances. Similarly, risk assessment 270 may analyze response data 208 to determine whether one or more portions of the message content are typical of an owner associated with the rental property or include responses that are not atypical. Further, risk assessment calculator 270 may identify unique indicia associated with the traveler or homeowner, such as a IP, MAC, and/or Bluetooth® address or identifier, or any other identifier to detect an anomaly (e.g., a prospective traveler or owner might be using an IP or MAC address that might not coincide with a traveler's or owner's physicality). Such anomalies may be quantified for calculating a level of risk or confidence as to whether the traveler or owner is authentic. Should risk calculator 270 generate risk assessment data 272 (e.g., a level of confidence) below a threshold, secured communications data model implementation 250 can be configured to block or otherwise disable the message dialogue and its messages from culminating in a rental transaction or an exchange of funds.

Figure 3:
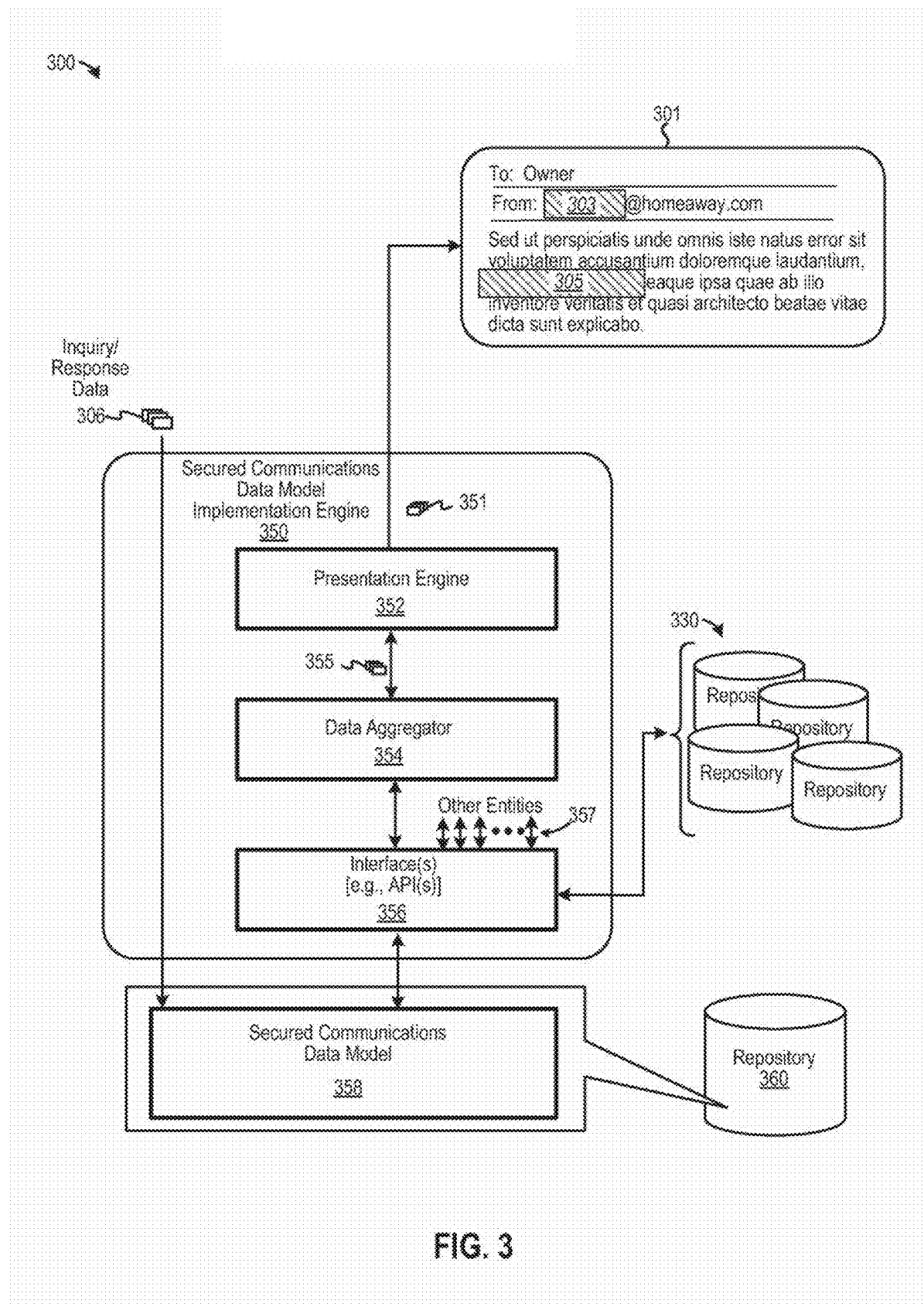
FIG. 3 is a diagram depicting portions of a secured communications data model implementation engine including a number of application layers and/or data models, according to some embodiments.

FIG. 3 is a diagram depicting portions of a secured communications data model implementation engine including a number of application layers and/or data models, according to some embodiments. Diagram 300 depicts a secured communications data model implementation engine 350 and a secured communications data model 358 configured to generate a secured message 301 (e.g., for display on a user interface based) with data retrieved from a variety of data sources 330, such as data repositories. Secured communications data model 358 is a data model (e.g., a data arrangement or requirement, or any type of data structure based on a domain model) that is disposed or otherwise configured to persist in a database associated with data repository 360. As shown, either secured communications data model 358 or secured communications data model implementation engine 350, or both, may be configured to receive inquiry and/or response data 306.

As shown, secured communications data model implementation engine 350 includes a presentation engine 352, a data aggregator 354, and one or more interfaces 356. In some examples, one or more interfaces 356 can be implemented as application programming interfaces, or APIs, configured to interact with other entities (that may be interested in accessing data model 358) via paths 357, as well as other sources of data 330. Interfaces 356 are configured to gather subsets of data relating to the exchange of messages persisting in secured communications data model 358, as well as any other related information (e.g., data relating to, or describing, a property attributes of a rental property of interest, including a property identifier that may include data representing a number of alpha-numeric symbols that uniquely identify or specify a specific piece of real property, such as a rental property offered by a property owner).

Data aggregator 354 is configured to aggregate data from data model 358 as well as data sources 330 for purposes of generating or building a view for a dashboard (e.g., an inbox) in which electronic message 301 may be displayed.

Upon generating a build view, build view data 354 is transmitted to presentation engine 352. According to some examples, presentation engine 352 is configured to index the view data into a search index (e.g., tagged with searchable indicia). Thereafter, recipient of index data 351 may be able to search data from at least data model 358, among other types of data.

Secured communications data model implementation engine 350 is configured to generate secured message 301 by, for example, excluding identity-related information. For example, secured message 301 may omit the user name associated with an email domain by, for example, obscuring the username a portion 303 of secured message 301. As another example, any identifying information (e.g., a telephone number, a name, an email address, etc.) placed in a body of a message, such as a portion 305, may be removed, obscured or rendered imperceptible. Other techniques for forming secured messages 301 are also within the scope of the present disclosure, and the examples described in relation to FIG. 3 are not intended to be limiting.

Figure 4:
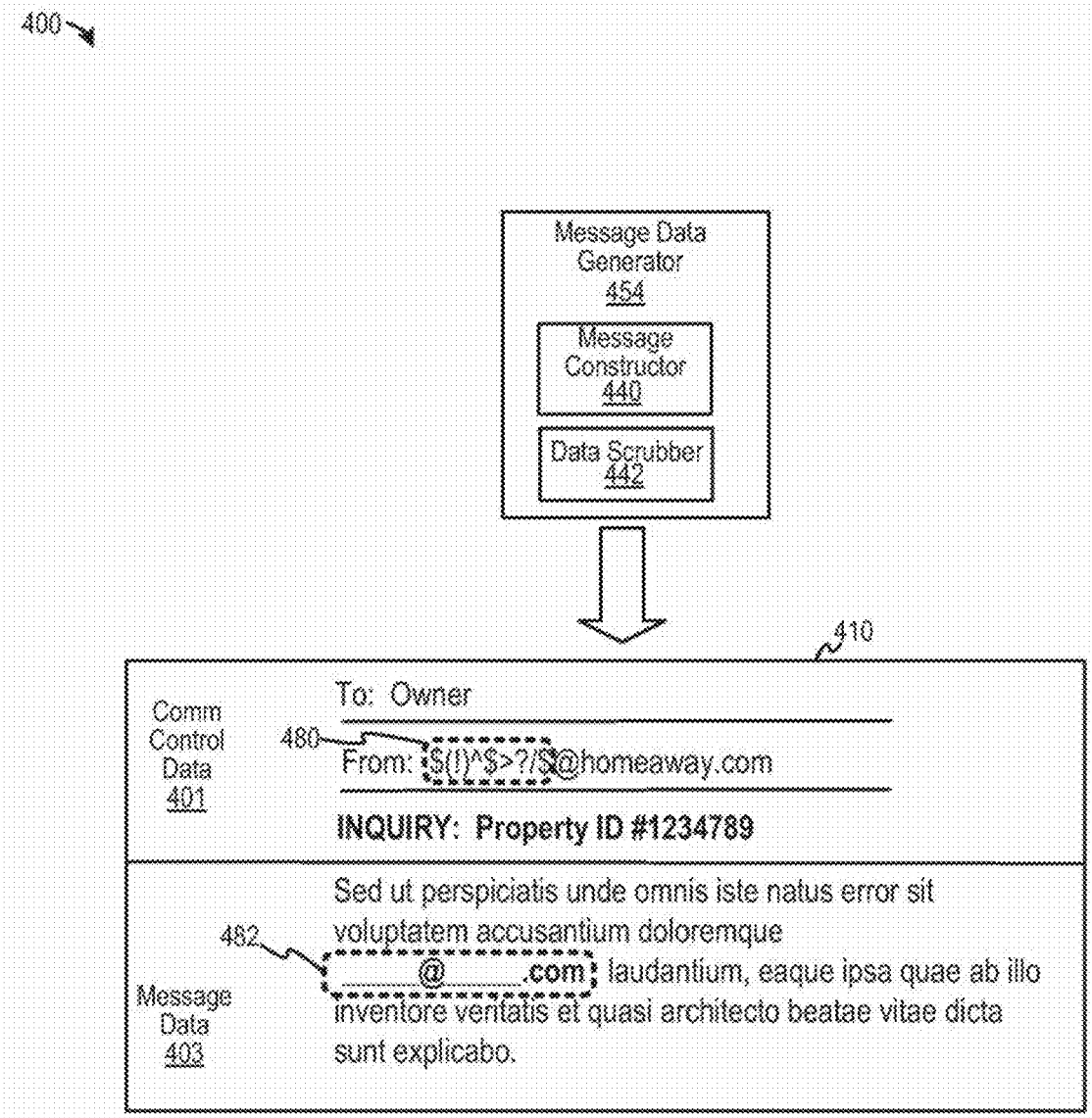
FIG. 4 is a diagram depicting a message data generator, according to some examples.

FIG. 4 is a diagram depicting a message data generator, according to some examples. Diagram 400 depicts a message data generator 454 including a message constructor 440 and a data scrubber 442. Note that elements depicted in diagram 400 of FIG. 4 may include structures and/or functions as similarly-named or similarly-numbered elements of other figures. Message data generator 454 is configured to generate electronic message 410, which includes a communications control data portion ("Comm Control Data") 401 and a message data portion 403.

Message constructor 440 may be configured to form the communications control data portion 401 and message data portion 403. Communications control data portion 401 may be a header, such as for email messages, or any other portion of a message that includes control information that may be used for transmitting the message. For example, in a text message, communications control data portion 401 may include a telephone number. According to some examples, message data portion 403 is a body of the message that may include free text as content.

Data scrubber 442 may be configured to suppress transmission of identity-related data that may be associated with electronic message 410. In some examples, data scrubber 442 may replace or mask a portion of text 480 with a unique key related to the identity of the user (e.g., a traveler's identity). In some examples, data scrubber 442 may be configured to assign a unique key that is configured to obscure at least a portion (e.g., portion 480) of identity data associated with data representing communication control data field 401. As shown, data scrubber 442 may be configured to substitute portion 480 of the identity data with a unique key, such as $(!)`$>?/$, as shown. In other examples, data scrubber 442 may be configured to secure a portion of the electronic message 410 by obscuring a rendering imperceptible a portion of message data portion 403. For instance, data scrubber 442 may be configured to substitute at least a portion 482 of identity data with masked data symbols configured to mask the portion of the identity data. As shown, at least some text of the identity is replaced by a symbol "_". Note that at least one of the masked data symbols may be representative of a type of electronic message or identifying information specified by the identify data. For example, symbols "@" and ".com" may be used to mask identity data and also indicates the type of information (i.e., an email address) that has been scrubbed from electronic message 410.

Data scrubber 442 may identify identity-related information by parsing through the symbols or text of a message and matching patterns to detect such information, according to some implementations. For example, data scrubber 442 may search for a regular expression ("regex"), which may be a pattern that data scrubber 442 attempts to match as input text, whereby such a pattern may include one or more character, operators, constructs, literals, or the like. Upon detecting a match, data scrubber 442 may perform a scrubbing operation so as to render identity data imperceptible. According to various other embodiments, other techniques may be used to render identity-related information or other sensitive information imperceptible to persons not authentically involved in a rental property transaction or other transaction.

Figure 5:
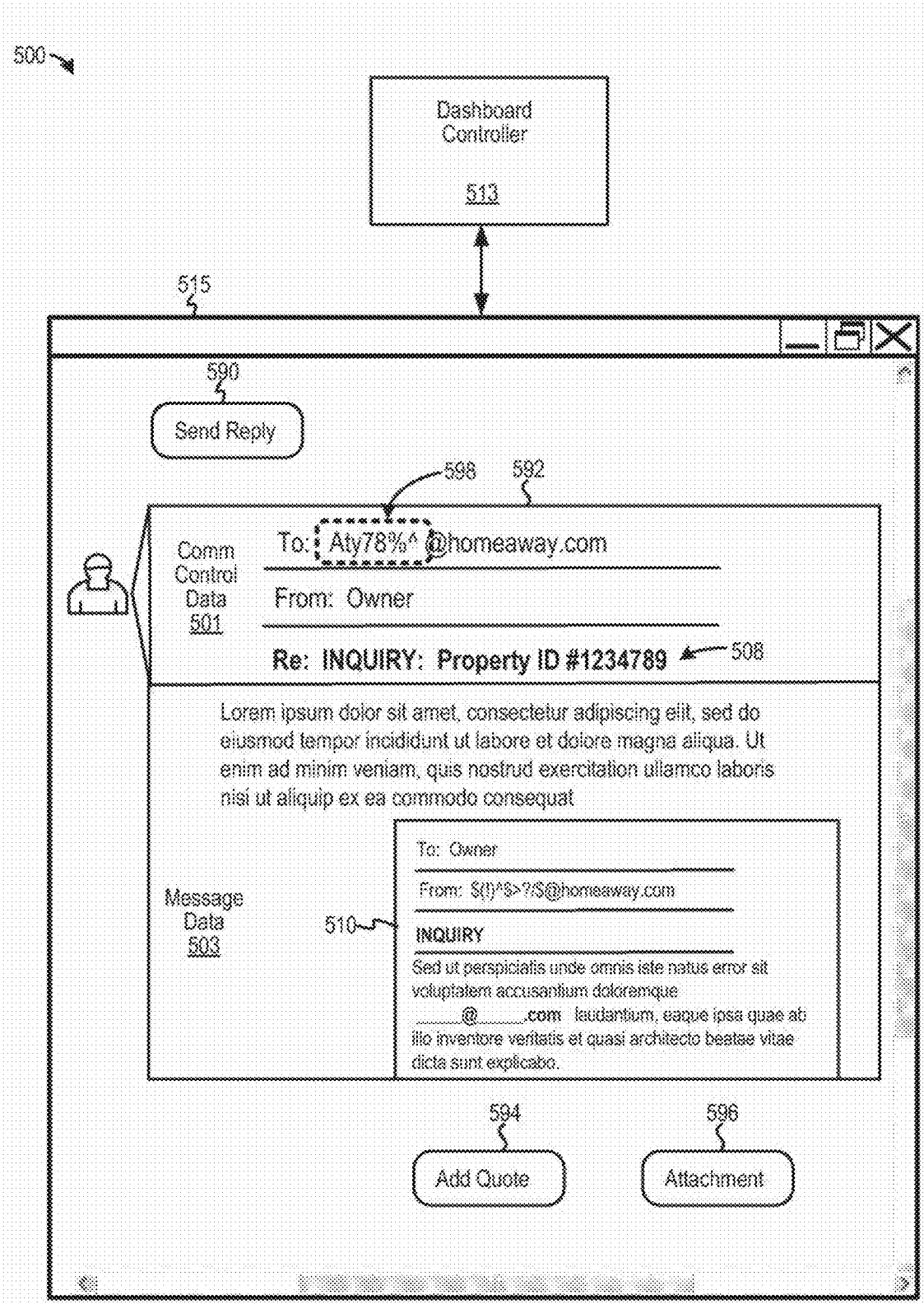
FIG. 5 is a diagram depicting an example of a user interface displaying a dashboard, according to some examples.

FIG. 5 is a diagram depicting an example of a user interface displaying a dashboard, according to some examples. Diagram 500 depicts a dashboard controller 513 being configured to generate and/or control operation of a user interface 515 implementing a dashboard. Note that one or more elements depicted in diagram 500 of FIG. 5 may include structures and/or functions as similarly-named or similarly-numbered elements of other figures. Dashboard controller 513 configured to form of view of a dashboard in which a portion of interface 515 includes electronic messages 592, as well as user input portions 590 (e.g., to send the reply), 594 (e.g., to add attached a quote with the reply), 596 (e.g., to attach a specific document, such as rental agreement), or any other user input or output portions to facilitate a dashboard renting properties.

In this example, electronic message(s) 592 may include a reply (e.g., from a responder-owner to an inquiry from an inquirer-traveler), which includes a copy 510 of the inquiring email (see electronic message 410 of FIG. 4) to which the owner is replying. In this reply, electronic message 592 includes a communications control data portion 501 and a message data portion 503, which includes a copy 510 of the previous communication. As shown, a data scrubber of the various examples "scrubbed" identity-related information in portion 598 of an email address. Thus, a unique key of "Aty78%^" may be assigned to a traveler that will receive the reply. In view of the above, multiple email exchanges regarding a rental property, which can be identified with Property ID ("#1234789") 508, may be performed securely so as to reduce or eliminate sensitive information in a thread of emails (e.g., constituting a message dialog).

Figure 6A:
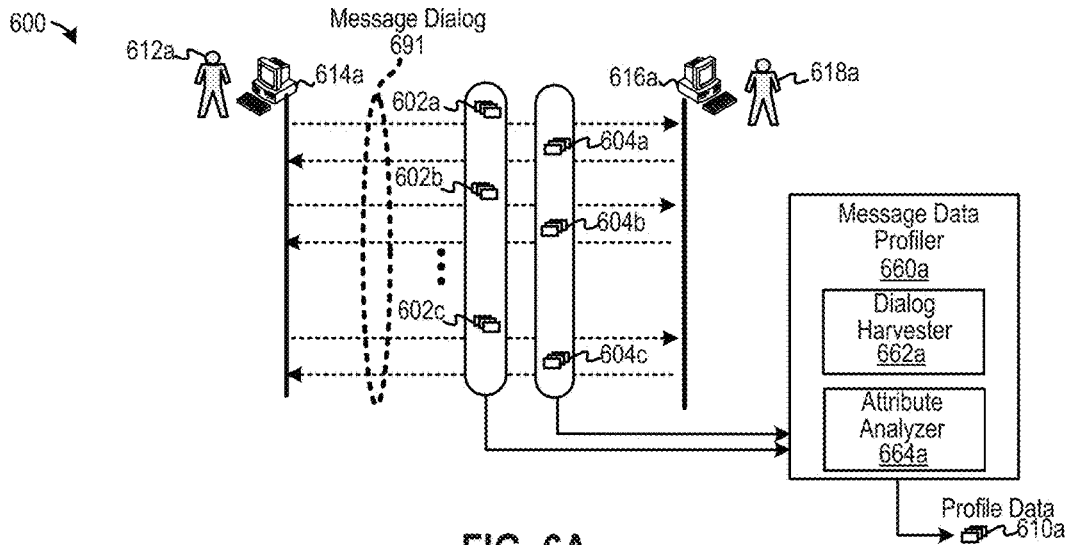
FIGS. 6A to 6C depict examples of a message data profiler, according to some examples.
Figure 6B:
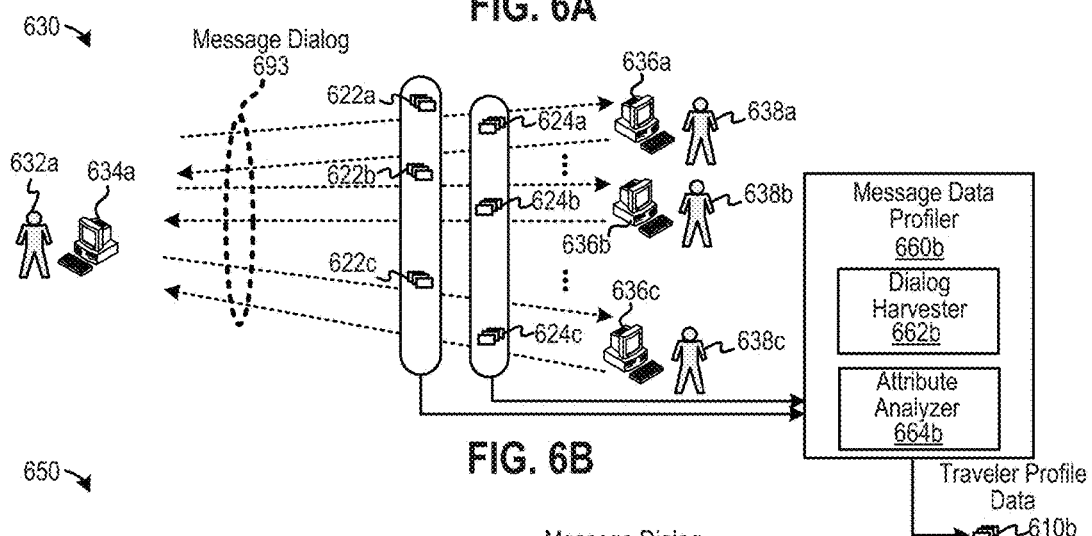
Figure 6C:
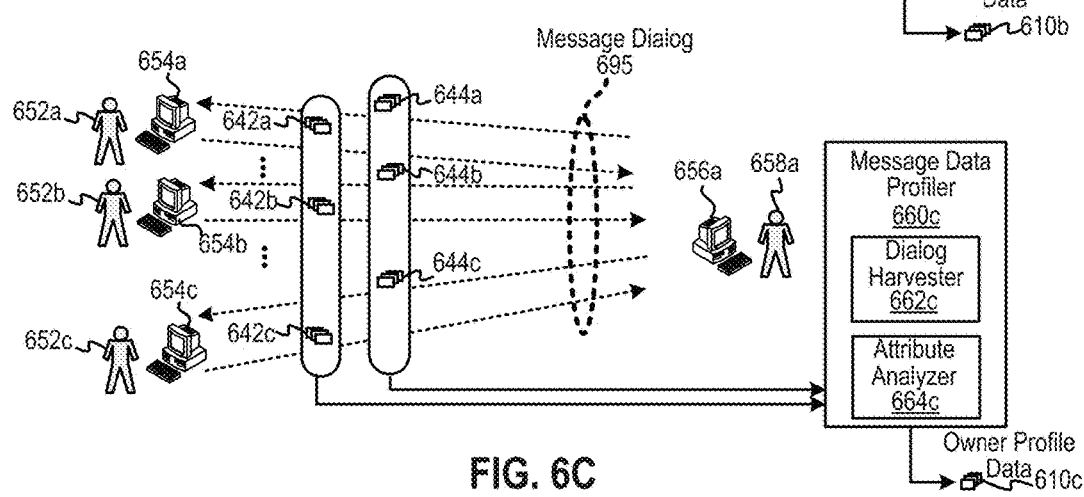

FIGS. 6A to 6C depict examples of a message data profiler, according to some examples. Diagram 600 of FIG. 6A depicts a message data profiler 660a that may be configured to extract, summarize, and/or analyze a message dialogue between a computing device 614a (associated with an inquirer 612a) and a computing device 616a (associated with an owner 618a). In particular, message data profiler 660a is configured to capture and analyze a series of response data messages 604a, 604b, and 604c (e.g., originating from an unauthenticated owner 618a) responsive to inquiry data messages 602a, 602b, and 602c (e.g., originating from an unauthenticated traveler 612a), respectively, whereby the collective group of electronic messages exchanged between computing devices 614a and 616a constitute a message dialogue 691. In some cases, a message dialogue 691 is, or may be stored in, a database and/or a data arrangement including portions of the content exchanged between the computing devices. Further, message data profiler 660a may be configured to generate profile data 610a that can be used to determine the authenticity of identity of a traveler 612a, an owner 618a, or both. Profile data 610a may represent a set of data that describes a normative interaction (or sets of interactions) between computing devices 614a and 616a. Profile data 610a may represent multiple sets of message dialogues 691 that lead up to, or have led up to, consummated rental transactions. Based on profile data 610a, a secure communication system, according to various examples described herein, may detect whether an unauthenticated owner 618a or an unauthenticated traveler 612a has caused an anomaly (e.g., an anomalous inquiry or response) that deviates from the profile data 610a. Such deviations may indicate that at least one of the parties using computing devices 614a and 616a may not be authentic. According to some examples, traveler 612a may be authenticated if data associated with that entity is not anomalous (e.g., within normative traveler tolerances), and owner 618a may be authenticated if data associated with that entity is also not anomalous (e.g., within normative owner tolerances).

To illustrate, consider that a non-smoking traveler 612a typically travels alone, without pets, for business purposes, and stays in a rental property owned by owner 618a. But in some cases, if owner 618a receives an inquiry from computing device 614a to rent the same property for 12 persons with 3 pets, and if the inquiry indicates the inquirer is a smoker, then such an inquiry may be deemed anomalous by a secure communication system, as the inquiry (and the data associated with such an inquiry) may deviate sufficiently from normative profile data 610a. As another illustration, consider that an authentic traveler 612a seeks to book a reservation for a rental property associated with an actual owner 618a. But if traveler 612a receives responses from computing device 616a in which payment terms have changed significantly (e.g., 100% payment is required one month in advance, or if the rental price has increased beyond normal rates), then a person operating computing device 616a may not be an authentic owner. As such, the secure communication system can disable the transaction from proceeding until an appropriate amount of further actions provide for authentication so that traveler 612a may be prevented in making a payment to a criminal posing as owner 618a.

Message data profiler 660a is shown to include a dialogue harvester 662a and an attribute analyzer 664a. Dialogue harvester 662a is configured to harvest the electronic messages exchanged in the formation of a database representing message dialogue 691. Dialogue harvester 662a may be configured to establish a data arrangement representing a messaging dialogue 691 by extracting subsets of data from the exchange of the electronic messages, and correlating the subsets of data to attribute data configured to describe a rental property of interest. In the example of exchanged emails, dialogue harvester 662a may implement natural language processing techniques, including known natural language processing algorithms, to correlate portions of text among multiple emails to determine a concept of interest. As an example, dialogue harvester 662a may correlate portions of text including "number of . . . people," "sleeps . . . 8," "number of . . . bedrooms," etc., as indicating a number of guests or occupants that may stay at the rental property. A number of occupants for a rental property may be considered an attribute or property attribute. As such, dialogue harvester 662a can characterize attribute data (e.g., characterize a number of travelers) to form characterized attribute data (e.g., 4 travelers) associated with the inquiry, whereby normative characterized attribute data may be depicted or stored in data templates of profile 610a (the data templates specify normal patterns of behavior for either a traveler or an owner, or both). Note that according to various embodiments, other types of attributes or property attributes (e.g., number of bathrooms, amount of deposit, if any, location, activities adjacent the rental property, etc.) may be correlated and analyzed against profile data 610a to determine one or more anomalous inquiries and/or responses.

Attribute analyzer 664a may be configured to analyze characterized attribute data (e.g., 4 travelers) against one or more data templates indicative of an anomalous portion of the exchange of the electronic messages based on (e.g., data templates) in profile data 610a that indicate numbers of travelers in the past (e.g., 1 traveler) or a likely (or predicted) number of travelers within a normative threshold (e.g., less than 5 travelers). Or, characterized attribute data may indicate an owner requires 100% payment in advance (unlike a number of past rentals in which the owner requested 50% payment in advance with 50% payment on the day beginning the rental period). Further, attribute analyzer 664a may detect an instance in which the characterized attribute data indicates an anomaly and causes a secure communication system to deny authorization to proceed (e.g., halting or barring access to the rental property as well as the transmission of funds). The secure communication system may be configured to generate a profile (e.g., using profile data 610a based on verified characterized attribute data), and may be further configured to match the characterized attribute data against the verified characterized attribute data. In some examples, verified characterized attribute data may represent normative data values that are within an acceptable range outside of which anomalous state of values may be found. Further, the secure communication system can identify an anomaly based on at least one mismatched subset of data.

Diagram 630 of FIG. 6B depicts a message data profiler 660b that may be configured to extract, summarize, and/or analyze a message dialogue between a computing device 634a (associated with an inquirer 632a) and a number of computing devices 636a, 636b, and 636c (associated with owners 638a, 638b, and 638c, respectively). In particular, message data profiler 660b is configured to capture and analyze a series of response data messages 624a, 624b, and 624c (e.g., originating from unauthenticated owners 638a, 638b, and 638c, respectively) responsive to inquiry data messages 622a, 622b, and 622c (e.g., originating from unauthenticated traveler 632a), respectively, whereby the collective group of electronic messages exchanged between computing devices 634a and computer devices 636a, 636b, and 636c constitute a message dialogue 693.

As shown, message data profiler 660b can include a dialogue harvester 662b and an attribute analyzer 664b. Note that one or more elements depicted in diagram 630 of FIG. 6B may include structures and/or functions as similarly-named or similarly-numbered elements of FIG. 6A or other figures. In this example, one or more data arrangements may be generated to represent one or more messaging dialogues 693 between inquirer 632a and multiple responders 638a, 638b, and 638c as owners of multiple rental properties. According to some examples, message data profiler 660b may be configured to generate traveler profile data 610b that sets forth data templates and/or normative data values associated with traveler 632a. Therefore, an analysis of a profile of traveler 632a may be performed to detect whether interactions originating from computing device 634a may be anomalous, thereby indicating the person generating a request or inquiry may not be the actual, authentic traveler 632a. In some examples, an anomaly may exist when an inquiry includes data that may deviate, beyond a tolerance, of normative data values.

Diagram 650 of FIG. 6C depicts a message data profiler 660c that may be configured to extract, summarize, and/or analyze a message dialogue between a number of computing devices 654a, 654b, and 654c (associated with travelers 652a, 652b, and 652c, respectively) and a computing device 656a (associated with an owner 658a). In particular, message data profiler 660c is configured to capture and analyze a series of response data messages 644a, 644b, and 644c (e.g., originating from an unauthenticated owner 658a) responsive to inquiry data messages 642a, 642b, and 642c (e.g., originating from unauthenticated travelers 652a, 652b, and 652c, respectively), respectively, whereby the collective group of electronic messages exchanged between computer devices 654a, 654b, and 654c and computing devices 656a may constitute a message dialogue 695.

As shown, message data profiler 660c can include a dialogue harvester 662c and an attribute analyzer 664c. Note that one or more elements depicted in diagram 650 of FIG. 6C may include structures and/or functions as similarly-named or similarly-numbered elements of FIG. 6B or other figures. In this example, one or more data arrangements may be generated to represent one or more messaging dialogues 695 between multiple inquirers 652a, 652b, and 652c and responder 658a. According to some examples, message data profiler 660c may be configured to generate owner profile data 610c that sets forth data templates and/or normative data values associated with owner 658a. Therefore, an analysis of a profile of owner 658a may be performed to detect whether interactions originating from computing device 656a may be anomalous, thereby indicating the person generating a response may not be the actual, authentic owner 658a. For example, an unscrupulous individual may have hijacked an email account associated with owner 658a, which, in turn, may lead to generation of anomalous responses. In some examples, an anomaly may exist when a response includes data that may deviate, beyond a tolerance, of normative data values.

Figure 7:
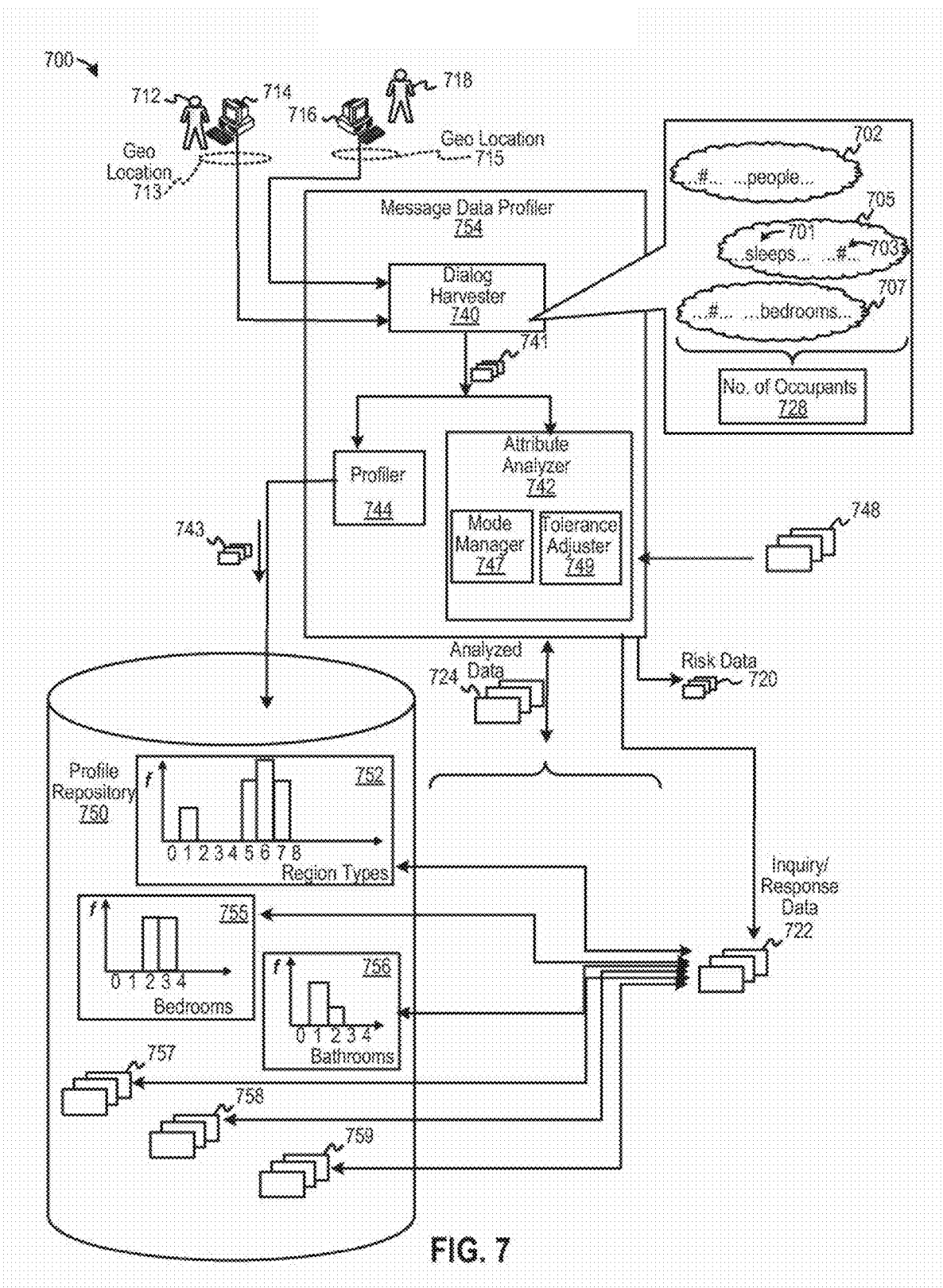
FIG. 7 is a diagram depicting a message data profiler configured to classify one or more portions of inquiry and/or response data, according to some examples.

FIG. 7 is a diagram depicting a message data profiler configured to one or more portions of inquiry and/or response data, according to some examples. Message data profiler 745 includes a dialogue harvester 740, a profiler 744, and an attribute analyzer 742. Note that one or more elements depicted in diagram 700 of FIG. 7 may include structures and/or functions as similarly-named or similarly-numbered elements of other figures. Message data profiler 745 may be configured to extract, summarize, analyze, and categorize portions of data in a message dialogue so as to characterize various attributes (e.g., a property attributes) of interest in a granting access to a rental property. In the example shown, message data profiler 745 is configured to receive inquiry data from an inquirer-traveler 712 via a computing device 714, and is further configured to receive response data from a responder-owner 718 via computing device 716. The data exchanged between computing devices 714 and 716 may be captured by message data profiler 754 to form a data structure representing a message dialogue. Further, dialogue harvester 740 may extract text for processing (e.g., natural language processing) to derive and identify attributes of interest using, for example, text analytics (e.g., including linguistic, statistical, and machine learning techniques), lexical analysis (e.g., tokenization), syntactic analysis, semantic analysis, computational linguistics, and other similar or variant techniques.

Thus, dialogue harvester 740 may identify certain property attributes that may be characterized for determining authenticity of either the identity of the traveler or the identity of the owner. Examples of property attributes include, but are not limited to, a number of bedrooms, a number of bathrooms, a type of region in which the rental property resides (e.g., a location type, such as a lake region, a mountain region, a waterfront property), a type of property (e.g., a house, a condominium, etc.), a price per unit of time (e.g., $3,500 per week), a type of accommodation (e.g., vacation rental, business rental, etc.), a minimum age limit for renters, an indication whether children are welcome, an indication whether smoking is permitted, an indication whether pets are allowed, an indication whether wheelchair accessibility is provided, an indication whether air-conditioning is provided, a number and/or type of activities available adjacent the rental property (e.g., skiing, golfing, swimming, etc.), a description of entertainment available within a rental unit, an indication whether a pool or spot is available, and any other attributes that may describe a rental property.

Dialogue harvester 740 may be further configured to generate data 741 representing subsets of property attributes associated with a message dialogue. To illustrate, consider an example in which dialogue harvester 740 parses through strings of text extracted from the exchanged electronic messages to identify contextually-relevant subsets of symbols or text. For example, dialogue harvester 740 may identify portions of text 702, 705, 707, and the like, can be identified as describing an attribute ("No. of Occupants") 728 that describes a number of travelers that will be staying at the rental property. Dialogue harvester 740 can identify textual message portions 701 (e.g., "people," "sleeps," "bedrooms") relevant to deriving a number of people that will be staying at the property, as well as message portions 703 (e.g., "#") that characterize the property attribute (e.g., characterizing the number of persons sleeping at the rental property by identifying a number).

Profiler 744 may be configured to generate profile data 743 that can be used to either profile a traveler or an owner based on individual data or anonymized aggregate data derived over a group of travelers or a group of owners. For example, profiler 744 may receive attribute data 741 that describes a number of attributes associated with a traveler or an owner. Profiler 744 can store the various attributes (e.g., as data templates, data files, data records, etc.) in profile repository 750 so that inquiry data or response data can be matched against data in repository 750 to determine whether normative or anomalous data may indicate an inauthentic traveler or owner. In the example shown, profile repository 750 includes data 752 representing a type of region or location at which the rental property resides. As shown, data 752 is depicted as a data template (e.g., a data pattern) describing a frequency, "f," with which a traveler rents at different regions. In this case, "0" can represent a city, "1" can represent a downtown area of the city, "2" can represent a beach area, "3" can represent a tropical region, "4" can represent an arid region, "5" can represent a forest area, "6" can represent a mountainous area, "7" can represent an area that receives snowfall, etc. Diagram 700 depicts that a traveler may have a profile such that the traveler most frequently (e.g., height of "f" bar graph) travels to region "6" (i.e., a mountainous area) and less frequently to "5" (i.e., a forest area) and "7" (i.e., an area that receives snowfall). This information may be helpful determine an authenticity of a traveler if the traveler frequently stays at a rental property for purposes skiing (e.g., with a family), but an off-season request for rental that excludes skiing may be less normative than is typical (e.g., more anomalous than is normal).

Similarly, profile repository 750 may include data 755 representing a frequency of renting a property with a certain number of bedrooms (e.g., indicating a number of travelers staying) and data 756 representing a frequency of renting a property with a certain number of bathrooms associated with the rental property. In some examples, traveler requesting one bedroom (e.g., none shown) may be deemed anomalous compared to past inquiries of rental properties having 2 and 3 bedrooms. Similarly, inquiries for rental properties having 3 bathrooms may be classified as anomalous compared to past rentals of properties having 1 and 2 bathrooms.

Further, profile repository 750 may include data 757 that includes data describing a traveler's or an owner's propensity to rent or lease the property with smoking permitted, data describing whether pets are permitted, data describing whether to accessibility is available for wheelchairs, and the like. Data 758 may include data describing identifiers that identify a computing device, such as computing devices 714 and 716. Examples of such identifiers include IP addresses, MAC addresses, Bluetooth identifiers, cell phone provider information (e.g., SIM card information), and other like information. Such information can be used to match against inquiry and response data 722 to determine whether an unknown or new computing device (including mobile computing devices, such as mobile phones) is being used, which may add a weighting to skew a classification toward indicating an anomaly. Further, IP addresses may be indicative of a geographical location ("geo location") 713 or 715 at which traveler 712 or owner 718, respectively, are communicating. If a geographical location 713 or 715 are beyond a threshold distance (e.g., an IP address associated with the country of Nigeria is detected when historically a location within the United States is anticipated), then electronic messages originating from such an IP address may be deemed anomalous. Data 759 may also include states, regions, countries, longitude and latitude coordinates, etc. that a traveler has visited or associated with the rental property. Such information may be used to predict whether a unique request a vacation rental in Fiji ought to be scrutinized determine whether a traveler or owner is authentic. Other types of data may be stored and aggregated to form a profile of a traveler and/or an owner for determining authenticity. According to some embodiments, profile data stored in profile repository 750 may be considered verified characterized attribute data as such types of data can be used as a standard to verify authenticity of a user.

Attribute analyzer 742 is configured to analyze profiles stored in profile repository 750 (e.g., profiles can include a number of data templates or a collection of subsets of data that constitute a profile), and may be configured to further analyze inquiry and/or response data 722 against the data in profile repository 750 to generate analyze data 724. Attribute analyzer 742 is shown to include a mode manager 747 and a tolerance adjuster 749. Mode manager 747 is configured to weight profile data stored in profile repository 754 travelers differently than owners, according to some examples. As such, mode manager 747 can modify operation of attribute analyzer 742 to analyze inquiry and/or response data 722 differently based on either operating in a traveler mode or an owner mode. Tolerance adjuster 749 is configured to adjust the tolerance with which to determine or classify one or more portions of inquiry and/or response data 722 as either normative or anomalous. For example, tolerance adjuster 749 can receive distance information 748 indicating, for instance, a distance that a traveler needs to travel to arrive at a rental property. The farther the distance a traveler must travel, the more expense a traveler risks when arriving at a rental property that may have been rented fraudulently. As such, tolerance adjuster 749 can reduce the tolerances of semi-normative values of attributes to enhance a certainty or likelihood that a traveler or owner is authentic. Attribute analyzer 742, therefore, is configured to compare inquiry and/or response data 722 against the various types of profile data stored in profile repository 750, and may be configured to further to generate risk data 720 indicating a level of confidence that either a traveler or an owner, or both, is authentic.

Figure 8:
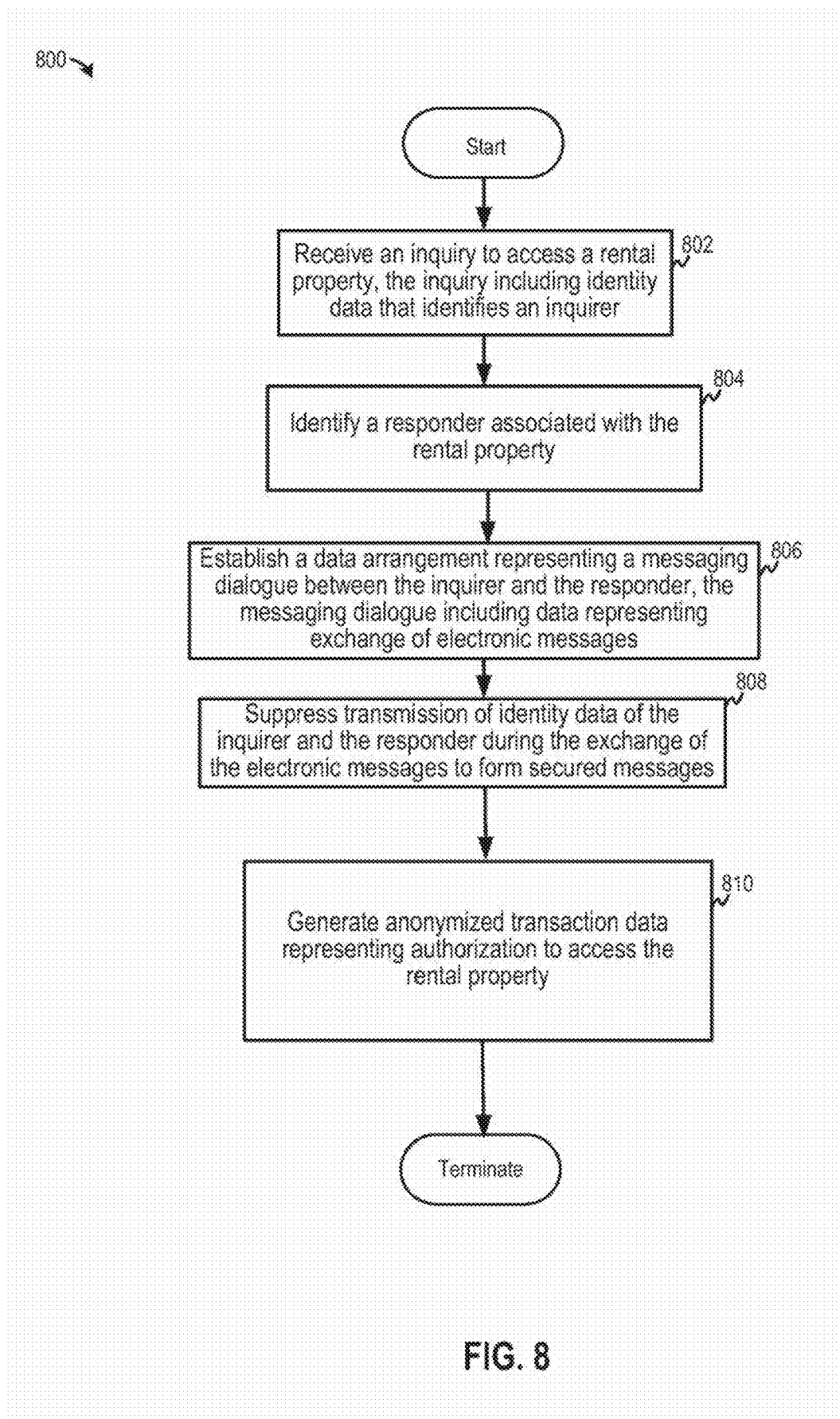
FIG. 8 is an example of a flow diagram to form a secure communication channel over which secure messages may be communicated, according to some embodiments.

FIG. 8 is an example of a flow diagram to form a secure communication channel over which secure messages may be communicated, according to some embodiments. At 802, flow 800 an inquiry to access a rental property may be received. The inquiry can include identity data that identifies an inquirer, such as a traveler. At 804, a responder associated with the rental property may be identified. A data arrangement representing a messaging dialogue between the inquirer and the responder may be established at 806. The messaging dialogue may include data representing exchange of electronic messages. At 808, transmission of identity data of either the inquirer or the responder, or both, may be suppressed (e.g., obfuscated or otherwise rendered imperceptible) during an exchange of the electronic messages to form secured messages. Anonymized transaction data representing authorization to access the rental property may be generated at 810. The anonymized transaction data may exclude identity information and other sensitive types of information that otherwise might be used by unscrupulous individuals for nefarious purposes. Further, a rental property transaction can be finalized with funds exchanged for access to a rental property, according to some examples, without identifying either a traveler or an owner. In some cases, the identities of a traveler and the owner may be non-anonymous subsequent to finalization of the transaction were based on consent of the parties (or for any approved other reason).

Figure 9:
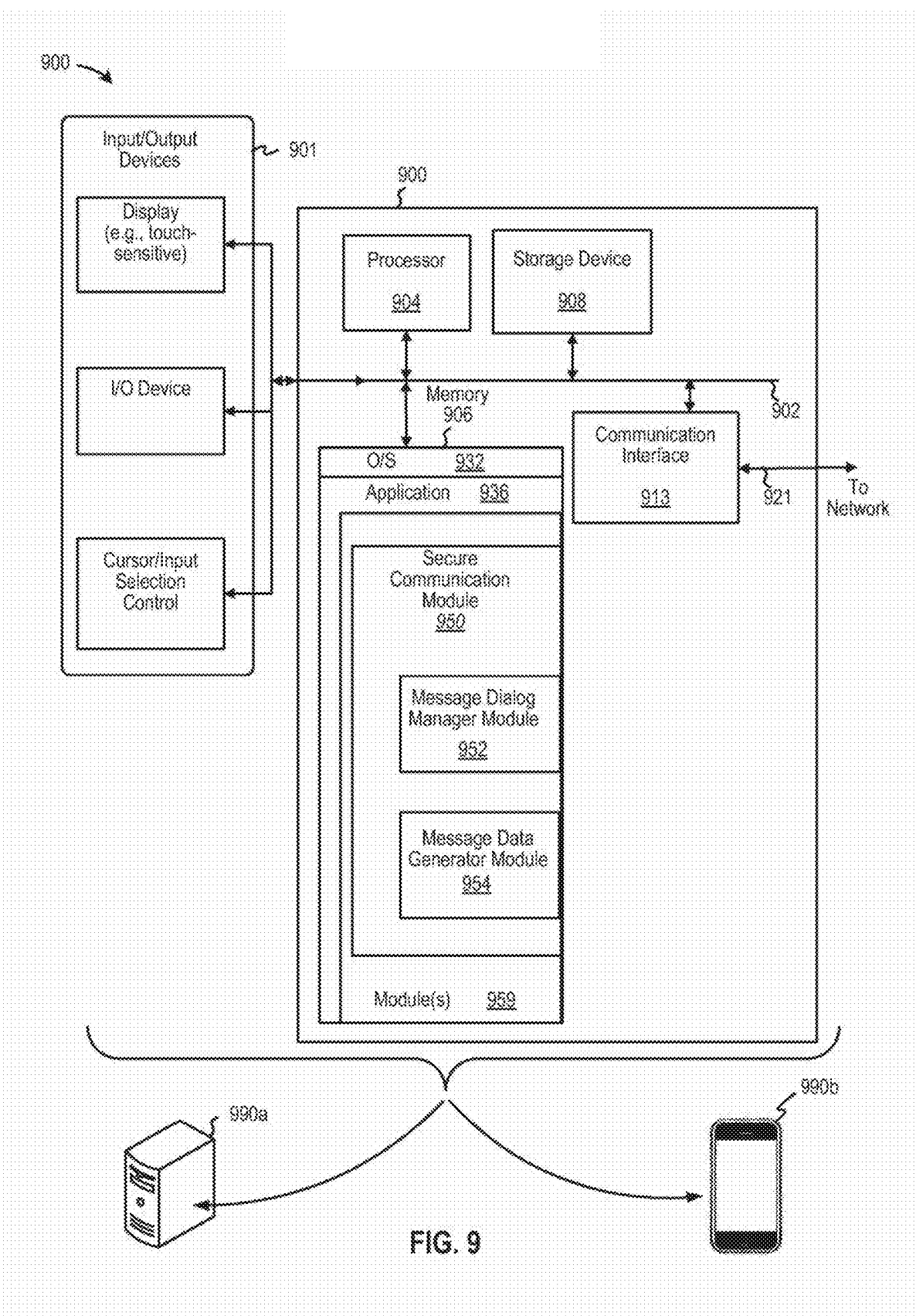
FIG. 9 illustrates an exemplary computing platform disposed in a computing system configured to establish a secure communication channel to communicate secured messages for authorizing access to rental properties in accordance with various embodiments.

FIG. 9 illustrates an exemplary computing platform disposed in a computing system configured to establish a secure communication channel to communicate secured messages for authorizing access to rental properties in accordance with various embodiments. In some examples, computing platform 900 may be used to implement computer programs, applications, methods, processes, algorithms, or other software to perform the above-described techniques.

In some cases, computing platform can be disposed in wearable device or implement, a mobile computing device 990*b*, or any other device, such as a computing device 990*a*.

Computing platform 900 includes a bus 902 or other communication mechanism for communicating information, which interconnects subsystems and devices, such as processor 904, system memory 906 (e.g., RAM, etc.), storage device 908 (e.g., ROM, etc.), a communication interface 913 (e.g., an Ethernet or wireless controller, a Bluetooth controller, etc.) to facilitate communications via a port on communication link 921 to communicate, for example, with a computing device, including mobile computing and/or communication devices with processors. Processor 904 can be implemented with one or more central processing units ("CPUs"), such as those manufactured by Intel® Corporation, or one or more virtual processors, as well as any combination of CPUs and virtual processors. Computing platform 900 exchanges data representing inputs and outputs via input-and-output devices 901, including, but not limited to, keyboards, mice, audio inputs (e.g., speech-to-text devices), user interfaces, displays, monitors, cursors, touch-sensitive displays, LCD or LED displays, and other I/O-related devices.

According to some examples, computing platform 900 performs specific operations by processor 904 executing one or more sequences of one or more instructions stored in system memory 906, and computing platform 900 can be implemented in a client-server arrangement, peer-to-peer arrangement, or as any mobile computing device, including smart phones and the like. Such instructions or data may be read into system memory 906 from another computer readable medium, such as storage device 908. In some examples, hard-wired circuitry may be used in place of or in combination with software instructions for implementation. Instructions may be embedded in software or firmware. The term "computer readable medium" refers to any tangible medium that participates in providing instructions to processor 904 for execution. Such a medium may take many forms, including but not limited to, non-volatile media and volatile media. Non-volatile media includes, for example, optical or magnetic disks and the like. Volatile media includes dynamic memory, such as system memory 906.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 902 for transmitting a computer data signal.

In some examples, execution of the sequences of instructions may be performed by computing platform 900. According to some examples, computing platform 900 can be coupled by communication link 921 (e.g., a wired network, such as LAN, PSTN, or any wireless network, including WiFi of various standards and protocols, Blue Tooth®, Zig-Bee, etc.) to any other processor to perform the sequence of instructions in coordination with (or asynchronous to) one another. Computing platform 900 may transmit and receive messages, data, and instructions, including program code (e.g., application code) through communication link 921 and communication interface 913. Received program code may be executed by processor 904 as it is received, and/or stored in memory 906 or other non-volatile storage for later execution.

In the example shown, system memory 906 can include various modules that include executable instructions to implement functionalities described herein. System memory 906 may include an operating system ("O/S") 932, as well as an application 936 and/or logic module(s) 959. In the example shown, system memory 906 includes a secure communication module 950, which includes a message dialog manager module 952 and a message data generator module 954, one or more portions of which can be configured to establish a secure communication channel to communication secured messages for authorizing access to rental properties by implementing one or more functions described herein.

In at least some examples, the structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, secure communications module 950, or one or more of their components, or any process or device described herein, can be in communication (e.g., wired or wirelessly) with a mobile device, such as a mobile phone or computing device, or can be disposed therein.

In some cases, a mobile device, or any networked computing device (not shown) in communication with one or more modules 959 and secure communications module 950, or one or more of its components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figure can represent one or more algorithms. Or, at least one of the elements can represent a portion of logic including a portion of hardware configured to provide constituent structures and/or functionalities.

For example, a secure communications module 950, or one or more of its components, or any process or device described herein, can be implemented in one or more computing devices (i.e., any mobile computing device, such as a wearable device, an audio device (such as headphones or a headset) or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit.

For example, a secure communications module 950, or one or more of its components, or any process or device described herein, can be implemented in one or more computing devices that include one or more circuits. Thus, at least one of the elements in the above-described figures can represent one or more components of hardware. Or, at least one of the elements can represent a portion of logic including a portion of circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed:

1. A computer-implemented method comprising:
    under control of a server computing device configured with specific computer-executable instructions,
        receiving data from an inquirer representing an inquiry regarding a rental property, the data including identity data that identifies a traveler;
        identifying a responder associated with the rental property;
        establishing a data arrangement representing a messaging dialogue between the inquirer and the responder, the messaging dialogue including data representing exchange of electronic messages;
        suppressing, by the server computing device, transmission of the identity data to the responder during the exchange of the electronic messages;
        determining, based at least in part on the identity data and a comparison between content of the electronic messages and content of previously exchanged electronic messages, a degree of risk that the inquirer is fraudulently impersonating the traveler; and
        transmitting data representing the degree of risk to the responder.

2. The computer-implemented method of claim 1, wherein suppressing transmission of the identity data comprises:
    identifying the identity data in the electronic messages; and
    removing the identity data from the electronic messages to form secured messages, wherein the exchange of electronic messages comprises transmitting the secured messages.

3. The computer-implemented method of claim 2, wherein removing the identity data from the electronic messages comprises:
    assigning a unique key configured to obscure at least a portion of the identity data associated with data representing a communication control data field; and
    substituting the portion of the identity data with the unique key in each electronic message that includes the portion of the identity data.

4. The computer-implemented method of claim 2, wherein removing the identity data from the electronic messages comprises:
    substituting at least a portion of the identity data with masked data symbols configured to mask the portion of the identity data in each electronic message that includes the portion of the identity data,
    wherein at least one of the masked data symbols is representative of a type of electronic message specified by the identity data.

5. The computer-implemented method of claim 1, further comprising:
    determining authorization to access the rental property; and
    transmitting the identity data of the inquirer to the responder.

6. The computer-implemented method of claim 5, wherein determining authorization to access the rental property comprises:
    generating data indicating an exchange of data indicative of a unit of value of the rental property.

7. The computer-implemented method of claim 1, wherein the identity data comprises one or more of a name, an email address, and a phone number.

8. The computer-implemented method of claim 1, wherein establishing the data arrangement representing the messaging dialogue comprises:
    extracting data from the exchange of the electronic messages, the data including at least a quantity specified by the inquirer;
    analyzing the data from the exchange of the electronic messages to identify a corresponding attribute of the rental property; and
    characterizing the data from the exchange of the electronic messages to form characterized attribute data associated with the inquiry.

9. The computer-implemented method of claim 8, wherein the degree of security risk is determined based at least in part on:
    analyzing the characterized attribute data against one or more data templates indicative of an anomalous portion of the exchange of the electronic messages; and
    detecting an instance of the characterized attribute data indicating an anomaly.

10. The computer-implemented method of claim 8, further comprising:
    obtaining verified characterized attribute data;

determining at least one mismatched attribute based at least in part on the characterized attribute data and the verified characterized attribute data; and identifying an anomaly based at least in part on the at least one mismatched attribute.

11. The computer-implemented method of claim 10, wherein the verified characterized attribute data is obtained from the previously exchanged electronic messages, and wherein the previously exchanged electronic messages were exchanged between the inquirer and the responder.

12. The computer-implemented method of claim 10, wherein the verified characterized attribute data is obtained from the previously exchanged electronic messages, and wherein the previously exchanged electronic messages were exchanged between the inquirer and one or more responders at least a second responder.

13. The computer-implemented method of claim 10, wherein the verified characterized attribute data is obtained from the previously exchanged electronic messages, and wherein the previously exchanged electronic messages were exchanged between the responder and at least a second inquirer.

14. The computer-implemented method of claim 1, wherein identifying the responder associated with the rental property comprises identifying a property identifier indicative of the rental property.

15. The computer-implemented method of claim 1, further comprising suppressing, by the server computing device, transmission of second identity data representing an identity of the responder to the inquirer during the exchange of the electronic messages.

16. The computer-implemented method of claim 1, further comprising determining that the inquiry comprises a request for an accommodation that corresponds to an accommodation previously requested by the inquirer, wherein determining the degree of risk is based at least in part on determining that the inquiry comprises the request for the accommodation that corresponds to the accommodation previously requested by the inquirer.

17. The computer-implemented method of claim 1, further comprising:
receiving data representing a response to the inquiry regarding the rental property, wherein the data representing the response includes second identity data that identifies the responder;
determining, based at least in part on the second identity data and the comparison between the content of the electronic messages and the content of previously exchanged electronic messages, a second degree of risk associated with the response; and
transmitting data representing the second degree of risk associated with the response to the inquirer.

18. A device comprising:
a memory configured to store computer-executable instructions;
a processor in communication with the memory, wherein the computer-executable instructions, when executed by the processor, configure the processor to at least:
receive, from an inquirer, data representing an inquiry regarding a rental property, the data including identity data that identifies a traveler;
identify a responder associated with the rental property;
establish a data arrangement representing a messaging dialogue between the inquirer and the responder, the messaging dialogue including data representing exchange of electronic messages;
suppress transmission of the identity data to the responder during the exchange of the electronic messages;
determine, based at least in part on the identity data and a comparison between content of the electronic messages and content of at least one previously exchanged electronic message, a degree of risk that the inquirer is fraudulently impersonating the traveler; and
transmit data representing the degree of risk to the responder.

19. The device of claim 18, wherein the processor is further configured to:
identify the identity data in at least one electronic message of the electronic messages; and
remove the identity data from the at least one electronic message to form secured messages, wherein the exchange of electronic messages comprises transmitting the secured messages.

20. The device of claim 18, wherein the processor is further configured to determine that the inquiry comprises a request for an accommodation that corresponds to an accommodation previously requested from the responder, wherein determining the degree of security risk is based at least in part on determining that the inquiry comprises the request for the accommodation that corresponds to the accommodation previously requested from the responder.

* * * * *

UNITED STATES PATENT AND TRADEMARK OFFICE
CERTIFICATE OF CORRECTION

PATENT NO. : 10,304,270 B2
APPLICATION NO. : 14/935222
DATED : May 28, 2019
INVENTOR(S) : Monette et al.

Page 1 of 1

It is certified that error appears in the above-identified patent and that said Letters Patent is hereby corrected as shown below:

In the Claims

Column 21, Line 15 (approx.), in Claim 12, after "and" delete "one or more responders".

Signed and Sealed this
Tenth Day of March, 2020

Andrei Iancu
*Director of the United States Patent and Trademark Office*